United States Patent [19]

Morel

[11] 4,151,428

[45] Apr. 24, 1979

[54] COATING OBJECTS BY ELECTROSTATIC SPRAYING

[76] Inventor: Roger Morel, 22 chemin des Marronniers, 38043 Grenoble, France

[21] Appl. No.: 921,597

[22] Filed: Jul. 3, 1978

Related U.S. Application Data

[63] Continuation of Ser. No. 802,888, Jun. 2, 1977, abandoned.

[30] Foreign Application Priority Data

Jun. 23, 1976 [FR] France ................................ 76 19660

[51] Int. Cl.[2] ............................ F16P 1/00; B05B 5/00

[52] U.S. Cl. ...................................... 307/328; 118/12; 200/61.62; 239/708

[58] Field of Search ............................... 118/629-635, 118/12; 427/13, 27, 28, 29, 32, 33, 14, 21; 361/212, 215, 216, 42, 38, 331, 380; 239/15; 200/58; 307/326-328

[56] References Cited

U.S. PATENT DOCUMENTS

| | | | |
|---|---|---|---|
| 1,564,925 | 12/1925 | Anthony | 361/215 |
| 1,633,218 | 6/1927 | McDonald et al. | 361/215 X |
| 3,276,615 | 10/1966 | DePew | 361/215 X |
| 3,864,603 | 2/1975 | Kozinski et al. | 118/12 X |
| 3,892,357 | 7/1975 | Tamny | 118/629 X |
| 3,929,286 | 12/1975 | Hastings et al. | 239/15 X |

*Primary Examiner*—Morris Kaplan
*Attorney, Agent, or Firm*—Brisebois & Kruger

[57] ABSTRACT

Safety device for an electrostatic painting plant using liquid coating products which are very electrically conductive, such as hydrosoluble paints or liquid enamel. An electrically insulating enclosure surrounds the container for the liquid coating material and has a latching device enabling the opening of the enclosure cover to be carried out only in a predetermined sequence, the first step of which causes the grounding of the paint container. The arrangement is such that the container can be disconnected from the ground only after the insulating enclosure cover has been replaced.

9 Claims, 8 Drawing Figures

COATING OBJECTS BY ELECTROSTATIC SPRAYING

This is a continuation of application Ser. No. 802,888, filed June 2, 1977, now abandoned.

SUMMARY OF THE INVENTION

The present invention concerns the coating of objects by electrostatic projection of liquid products which are of relatively high electrical conductivity, such as for example the paints called "hydrosoluble" and liquid glaze, in particular those sprayed by electrostatic paint guns of the hand held type.

Electrostatic painting installations and apparatus using products with a very high electrical conductivity often present a danger for the user. In fact, the liquid container for such highly conductive paints is generally held at a high voltage, so that precautions are necessary to keep the operator from touching the container.

French Pat. No. 2,094,305 has already proposed placing the paint container in an insulated chamber with a wall thickness sufficient to avoid all electrical discharge, and this provides good safety. In addition, installations of this type sold up to now by the applicant's assignee include two additional safety features:

(a) the insulating chamber is furnished with an interrupter which, activated by the cover of the chamber, disconnects the high voltage generator when the cover is lifted;

(b) each manual gun is furnished with an "air-flow switch" which also disconnects the generator, to cut off the high voltage, when one releases the pressure on the trigger of the gun.

There exists nevertheless a risk of injury to a person opening the cover of the insulating chamber, while another is painting, and who would immediately tough the liquid container. If this action is very rapid, the container which has high capacitance does not have time to discharge completely, and the person opening the cover would receive a substantial and dangerous electrical shock.

The present invention has for an object, increasing the safety of the prior devices, by eliminating in particular the risk mentioned above. To obtain this result, the insulating chamber includes an arrangement by which the operation of opening the cover of the chamber can be effected only by several required successive operations, the first of these operations grounding the conductive paint container. By "required successive operations", it is meant that the second operation, for example, cannot be started until the first operation is completely finished. Likewise, the apparatus of the invention is such that one cannot disconnect the container from the ground until after the cover has been replaced on the insulating chamber. Of course, one would always be interested in using, in combination with the apparatus of the invention, paint guns furnished with an air-flow switch to disconnect the high voltage source from the paint container so the operator or painter would open the cover only while the generator is de-energized or disconnected because the operator would have stopped painting before removing the cover. Hence, the high voltage source or generator is short-circuited to ground, with the apparatus of this invention, only in unusual circumstances.

The various arrangements possible for practicing this invention are many, and variations will of course be apparent to one skilled in the art.

The description which follows describes two exemplary embodiments.

BRIEF DESCRIPTION OF THE DRAWINGS

Referring to FIG. 1, there is shown apparatus according to the invention including a container 1 to hold a liquid coating product such as paint. Of course, the coating product within container 1 has relatively high electrical conductivity as compared with the usual non-conducting paints. For example, the liquid paint in container 1 can be a hydrosoluble paint whose resistivity can be on the order of 2,000 ohms.cm.

Figure 1:
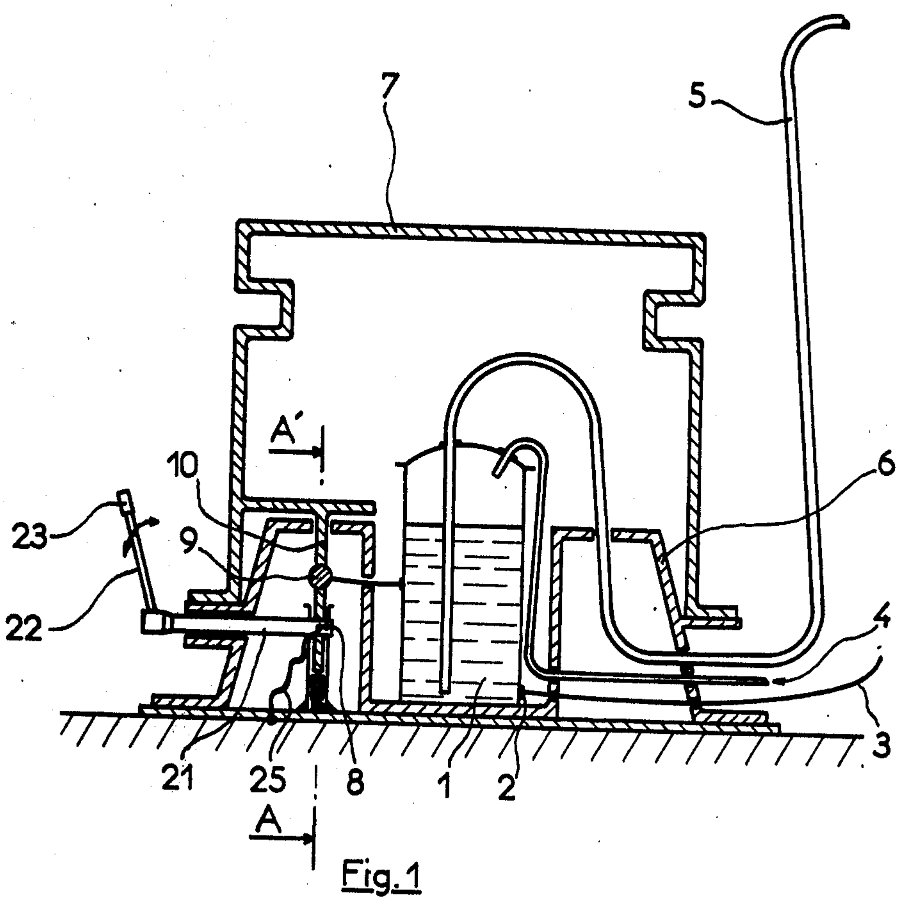
FIG. 1 is a side view in section of a first embodiment of apparatus according to the invention.

The container 1 is, for example, metal of good electrical conductivity, and is maintained at a high voltage by the connection at 2 of a high voltage cable 3 connected to a suitable high voltage generator (not shown). As shown, container 1 is closed, and a compressed air pipe 4 communicates with the upper portion of the container to supply compressed air which forces the paint through a pipe or hose 5 to the usual electrostatic type paint gun (not shown).

As disclosed in French Pat. No. 2,094,305, container 1 is placed in an insulating chamber composed of a lower part or base 6 and a removable cover 7. This insulating chamber has walls of a suitable electrically insulating material with walls sufficiently thick to avoid electrical shock to one touching the outside surfaces of the chamber.

This apparatus has, according to the invention, a locking safety device 8 for the cover 7. The safety device 8 includes:

a contact ball 9 electrically connected to the metal container 1. Contact ball 9 can be mounted on a rigid conductor secured to the side of the container so it is supported by the conductor, and projects into the region of base 6, as shown at FIG. 1;

an elongated lock element 10 which forms part of cover 7 and projects downwardly from the cover, this element having a locking notch 11, in one side thereof;

a well or receptacle 12 to slidably receive the locking element 10 therein, this well containing a cylindrical block 13 engaging a spring 14 at the bottom of the well.

Figure 2:
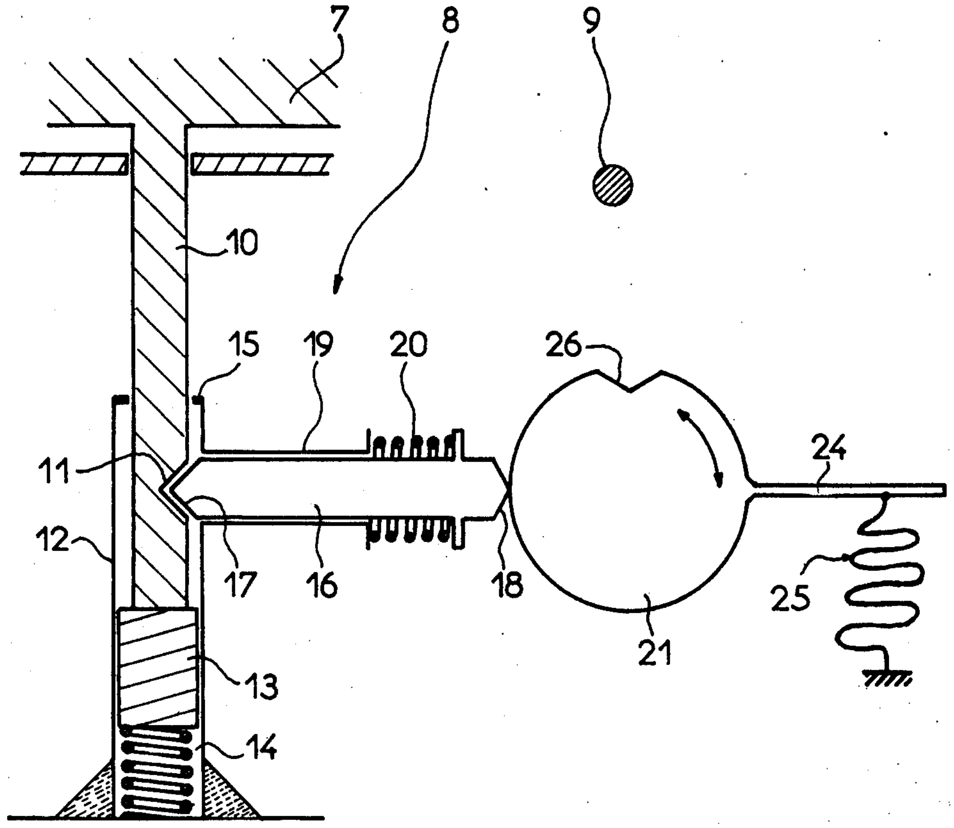
FIG. 2 is an enlarged partial view in partial section taken along line A—A of FIG. 1, and showing the position of the apparatus of FIG. 1 with the insulating cover locked in position.
Figure 3:
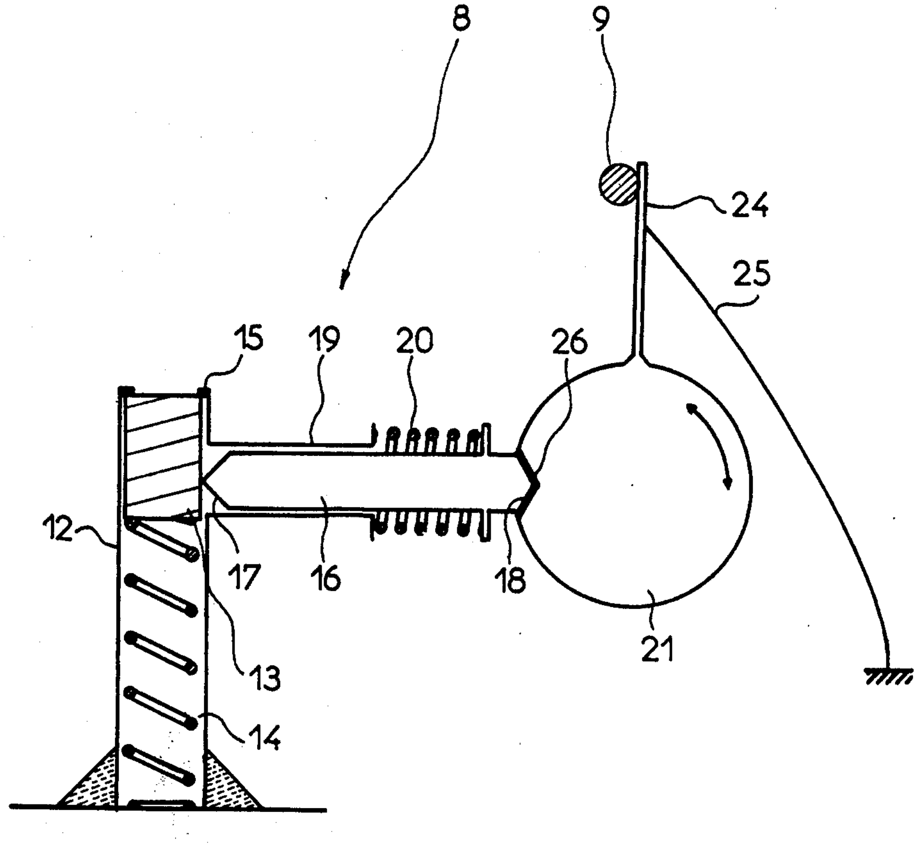
FIG. 3 is a view generally corresponding to FIG. 2 and showing the cover removed and the container grounding system locked against ungrounding.

The upper end of well 12 has an annular stop to prevent spring 14 from forcing locking block 13 out of the well;

a lock bar 16 with beveled ends 17 and 18 arranged to slide in a guide 19 extending perpendicular to the axis of well 12. Mounted on lock bar 16 is a spring 20 which urges the bar to the right as shown in FIGS. 2 and 3, by virtue of the action of the spring between the end shoulder of guide 19, and a collar on the lock bar;

a shaft 21 with a notch 26 at one circumferential location of its periphery, as shown at FIGS. 2 and 3. Shaft 21 has, at its outer end, a lever 22 with a handle 23 for manually rotating the shaft. Fixed to the inner end of the shaft is a flexible metal pin or arm which functions as a resilient contact and moves in a vertical plane including contact ball 9 when the shaft is turned. Pin 24 is electrically connected to electrical ground by a braided flexible conductor 25.

The operation of the embodiment of FIGS. 1–3 will now be described. With cover 7 in place, there is no danger of electrical shock to one touching either base 6 or cover 7 of the insulating material enclosure. Both air feed pipe 4 and the paint pipe 5 are of course made of a suitable insulating material or are suitably insulated to prevent shock to one touching these pipes.

With cover 7 in place, as shown at FIGS. 1 and 2, and with the shaft in the position shown in these figures, the beveled end 17 of lock bar 16 is maintained in notch 11 of cover element 10, by shaft 21. Cover 7 cannot be lifted so long as lock bar 16 locks element 10 in the FIG. 2 position. It will be noticed from FIG. 2, that with the cover locked, the notch 26 in shaft 21 is approximately ¼ turn (90°) from the beveled end 18 of the lock bar. In this position, where the cover is locked to base 6, the grounding ball 9 is not grounded, and correspondingly, tank 1 is maintained at high voltage by the electricity from wire 3 (FIG. 1). While not shown, it is to be understood that wire 3 could be connected to container 1 through a switch in the "on" position when shaft 21 is in the FIG. 2 position, and which is operated to an "off" position to disconnect wire 3 from tank 1 when the shaft is rotated to the FIG. 3 position.

In order to remove cover 7 it is necessary first of all to release lock element 10 of the cover. This is done by grasping handle 23 and turning the shaft ¼ turn counter clockwise from the position of FIG. 2 to the position of FIG. 3, so that the beveled end 18 of lockbar 16 can move into notch 26 of the shaft. When notch 26 aligns with end 18 of the lockbar 16, the lockbar is withdrawn from notch 11 of cover member 10 by the action of spring 20, to the position shown at FIG. 3. Simultaneously, however, contact arm 24 is brought into engagement with grounding ball 9 so that container 1 is electrically grounded through the connection between the container and the ball, contact 24, and the flexible grounding conductor 25. Preferably, spring 14 is relatively weak, and is not of sufficient strength to lift cover 7 when lock element 10 is released. Hence, it is necessary for the person removing the cover, to next lift the cover from the apparatus, which of course comprises the second step of removing the cover. Spring 14, however, is of sufficient strength to move the cylindrical stop 13 to the position shown at FIG. 3 after the cover is lifted and its weight is removed. With the cover removed the cylindrical stop 13 is forced upwardly against shoulder 15 to block movement of lockbar 16 to the left.

With the lockbar 16 held in the position of FIG. 3 by cylindrical stop 13, shaft 21 cannot be rotated by virtue of the engagement of the lockbar end 18 in notch 26 of the shaft. Correspondingly, container 1 cannot be ungrounded since contact 24 remains in engagement with ball 9 and shaft 21 cannot be rotated to disconnect the ground so long as the cover is removed.

It is not possible to disconnect container 1 from ground until the cover is replaced. Upon replacement of the cover, element 10 of the cover forces stop 13 downwardly, but shaft 21 cannot be rotated until notch 11 of element 10 is aligned with beveled end 17 of the lockbar 16. With the element 10 in the position of FIG. 2, shaft 21 can be rotated from the FIG. 3 position to the FIG. 2 position, such rotation driving the lockbar out of notch 26 of the shaft, and the cylindrical surface of the shaft holding the lockbar in the cover locked position of FIG. 2. During such rotation, resilient contact 24 is separated from contact ball 9 and the container is thus disconnected from ground. In order to again remove the cover 7, it is first necessary to rotate the shaft 21 to the FIG. 3 position where the container is grounded, before the cover can be removed. This interlock arrangement which requires first unlocking and simultaneously grounding the container before the insulating cover 7 can be removed, assures that any residual high voltage on the container is dissipated prior to the time the container becomes exposed by removing the cover.

FIGS. 4–8 disclose a second embodiment, in accordance with this invention. In this embodiment, the insulating base 6 is constructed with an upper rim 34 preferably having several bayonet slot type openings, like opening 30 (FIGS. 5 and 7) formed therein. Beneath this upper rim 34, base 6 has a lower rim 35. Secured to rim 35 is a contact ball 9 which is in turn electrically connected to paint container 1 by a suitable conductor (not shown). Slidably carried by lower rim 35 is a movable contact 33 which in the position shown at FIG. 6 engages ball 9 to ground the container, the connection of this movable contact 33 to electrical ground being via a flexible conductor 32. This movable contact can take the form of a pair of spring arms on opposite sides of lower rim 35, the arms being connected together to prevent their separation from the rim, and being guided by the rim for sliding movement between the positions of FIGS. 6 and 8.

Cover 7 includes one or more fingers 27 which project downwardly from a cover step 36. Each finger has a cylindrical enlargement 28 of a size to be received in the larger diameter portion of bayonet slot 30. Each finger also has a lower extremity which extends downwardly through lower rim 35, when the cover is positioned on the base 6. Contact 31 has an opening 33 to receive the lower extremity 29 of the finger.

Figure 4:
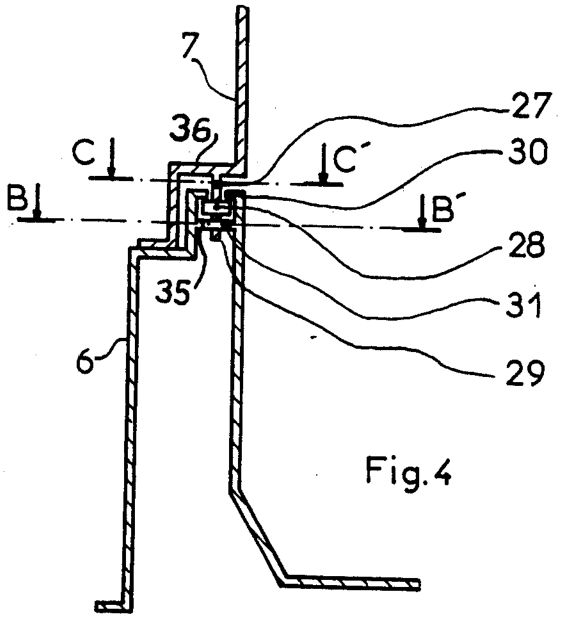
FIG. 4 is a partial view in section of an insulating enclosure for a paint container, according to a second embodiment of the invention.
Figure 7:
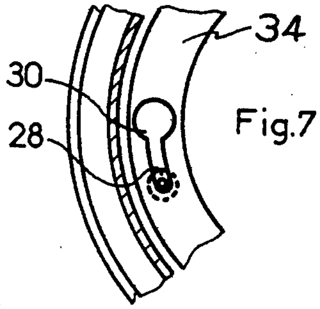
FIG. 7 is a view corresponding to FIG. 5 but showing the cover parts in the closed and locked position.
Figure 8:
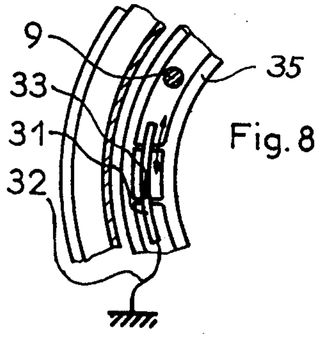
FIG. 8 is a view corresponding to FIG. 6 and showing the position of a grounding element when the cover is locked.

FIGS. 4, 7 and 8 show cover 7 locked in position on base 6. In this position, cylindrical enlargement 28 of each finger is beneath the narrow portion of the bayonet slot 30 and the cover is therefore locked against upward removal. As shown at FIG. 8, contact 31 is spaced from ball 9, so the container is not grounded. This is of course the normal operating position for the contact 31 with the cover in position, where high voltage is applied to the paint container 1, to permit electrostatic painting.

Figure 5:
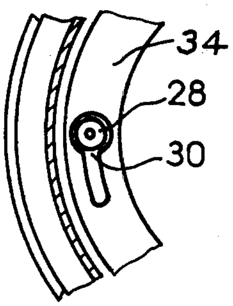
FIG. 5 is a partial sectional view in plan taken along lone C—C of FIG. 4 and showing the position of the parts when the cover is unlocked for removal.

To remove cover 7 it is first necessary to rotate the cover clockwise from the position of FIGS. 7 and 8, so that the cylindrical enlargement 28 moves to the large diameter portion of bayonet slots 30. In this position, as shown in FIG. 5, the cover is unlocked and can be lifted for removal. However, during rotation of the cover to the FIG. 5 position, the lower portion of finger 29, engaged in the opening 33 of contact 31, has rotated the contact in a horizontal plane, under the guidance of lower rim 35, so this contact 31 engages ball 9 to ground container 1. Preferably, the contact 33 is of sufficient length that ball 9 is engaged to ground the paint container at some intermediate position of the cover between the positions shown at FIGS. 7 and 5, respectively, to assure that the paint container is grounded before the cover is rotated to the position where it can be lifted.

Figure 6:
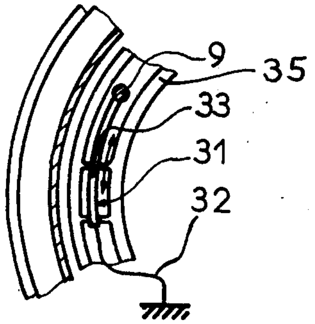
FIG. 6 is a partial sectional view in plan taken along line B—B of FIG. 4, and showing a grounding element grounding the container when the cover is in its unlocked for removal position.

It should be noted with particularity that movable contact 31 remains in the position of FIG. 6, thereby grounding the paint container, until the cover is replaced, and is rotated toward its locked position of FIG. 7. Correspondingly, the container remains grounded so long as cover 7 is removed or is in its unlocked position.

Of course, several bayonet slots 30 and fingers 27 can be provided, at spaced apart intervals around the top of base 6, and a grounding ball and movable contact 31 can be provided at each of these positions. This assures that the paint container 1 will remain grounded so long as the cover is removed, even though one of the contacts 31 accidentally shifts away from ball 9. Of course, to replace the cover, where several contacts are used, it is necessary to align the enlargements 28 on each of the fingers 27 with the larger diameter portions of bayonet slot 30. Moving the cover downwardly so the enlargements 28 are below upper rim 34, causes the lower extremities 29 to engage in the openings in movable contacts 31. Hence, when the cover is rotated counter clockwise to the FIG. 7 position of enlargements 28, contacts 31 are simultaneously moved to a position out of engagement with balls 9 so the container 1 is no longer grounded.

Of course, a switch can be provided in the wire, such as the wire 3, between the high voltage source and the container, to disconnect the high voltage from the container in response to rotating the cover to its unlocked position. The grounding arrangement however, assures that any residual high voltage on the container will be dissipated before the person removing the cover can lift it clear of the container 1.

While two preferred embodiments have been shown and described, it is to be understood that numerous changes can be made without departing from the scope of this invention as mentioned herein and as defined in the appended claims.

What is claimed is:

1. In an electrostatic coating apparatus for coating objects with an electrically conductive product, of the type in which a container for the conductive product is disposed in an electrically insulating chamber having a removable cover, said container being normally maintained at a relatively high voltage; the improvement comprising, an electrical ground, means for locking the cover in position on the container, means for electrically connecting the container to the electrical ground, operating means for controlling said means for locking the cover and said means for electrically connecting the container to ground so that said locking means does not release said cover for removal until said means for electrically connecting electrically connects said container to the electrical ground, said means for locking including means requiring relocking the cover on said container before said means for electrically connecting can disconnect the container from the electrical ground whereby the cover is locked on said container whenever the container is ungrounded.

2. In an electrostatic coating apparatus for coating objects with an electrically conductive product, and of the type in which a container for the conductive product is disposed within an electrically insulating chamber having a removable cover, said container normally being maintained at a relatively high voltage, the improvement comprising an electrical ground for the container, locking means for locking said cover on said container, operating means for operating said locking means to a cover unlocked position for electrically connecting said container to said electrical ground before said cover can be removed, said locking means including means requiring replacement of said cover on said container before said operating means can be operated to lock said cover and disconnect said container from said electrical ground.

3. Apparatus according to claim 2, wherein said locking means comprises a locking element fixed to the cover, a lock bar cooperable with said locking element, means for moving said lockbar into locking engagement with said locking element in the locked position, and means maintaining said lockbar in locking engagement with cam means for maintaining the container electrically connected to the electrical ground when said cover is unlocked.

4. Apparatus according to claim 3, wherein said operating means includes a rotatable shaft, said shaft having a contact arm connected for swinging movement between an open circuit position and a ground position electrically connected to the electrical ground.

5. Apparatus according to claim 4, wherein said locking element includes means to release said lockbar thereby freeing said contact arm for movement out of circuit with said electrical ground once the cover is locked on said container.

6. Apparatus according to claim 5, wherein said lockbar is adapted to engage notches in said locking element and said shaft respectively, and resilient means urge said locking element into position for engagement with said lockbar.

7. Apparatus accoridng to claim 2, wherein said operating means is connected to said cover and said cover has a locked position and a released position, said cover being mounted for angular movement between said positions to operate said locking means to lock and unlock the cover.

8. Apparatus according to claim 7, wherein said locking means includes fingers and slots respectively on said cover and a base for supporting the cover, each said slot having an enlarged portion defining the released position of the cover and a narrow portion for the locked position, and each said finger having an enlarged portion for preventing removal of said cover except in said released position.

9. Apparatus according to claim 8, further comprising a contact member to close the electrical connection with said electrical ground in response to the displacement of said cover relative to said container from said locked position towards said released position at a position intermediate the aforesaid positions.

* * * * *